(12) United States Patent
Ganesan (10) Patent No.: US 9,197,406 B2
(45) Date of Patent: *Nov. 24, 2015

(54) KEY MANAGEMENT USING QUASI OUT OF BAND AUTHENTICATION ARCHITECTURE

(71) Applicant: Authentify, Inc., Chicago, IL (US)

(72) Inventor: Ravi Ganesan, West Palm Beach, FL (US)

(73) Assignee: AUTHENTIFY, INC., Chicago, IL (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/187,097

(22) Filed: Feb. 21, 2014

(65) Prior Publication Data

US 2014/0173284 A1 Jun. 19, 2014

Related U.S. Application Data

(63) Continuation of application No. 13/089,430, filed on Apr. 19, 2011, now Pat. No. 8,713,325.

(51) Int. Cl.
*G06F 21/00* (2013.01)
*H04L 9/08* (2006.01)
(Continued)

(52) U.S. Cl.
CPC ............ *H04L 9/0819* (2013.01); *H04L 9/3281* (2013.01); *H04L 63/0428* (2013.01); *H04L 63/0435* (2013.01); *H04L 63/0442* (2013.01);
(Continued)

(58) Field of Classification Search
CPC ..................... H04L 63/0838; H04L 2463/082; H04L 63/18; H04L 9/3215
See application file for complete search history.

(56) References Cited

U.S. PATENT DOCUMENTS 6,223,287 B1 4/2001 Douglas et al.
7,861,077 B1 12/2010 Gallagher, III
(Continued)

FOREIGN PATENT DOCUMENTS

EP 1445917 A2 11/2004
EP 1 919 123 A1 5/2008
(Continued)

OTHER PUBLICATIONS

Notification of Reasons for Rejection dated Sep. 3, 2014 in Japanese Patent Application No. 2014-506447.
(Continued)

*Primary Examiner* — Michael Chao
(74) *Attorney, Agent, or Firm* — Sughrue Mion, PLLC (57) ABSTRACT

To provide key management layered on a quasi-out-of-band authentication system, a security server receives a request for activation of a user interface window for a particular user from a network device via a communication channel. It then transmits an activation PIN to an out of band authentication system for forwarding to the user's telephone via a voice or text message. It next receives the previously transmitted PIN from the network device via the communication channel, and authenticates the user based on the received PIN. After authenticating the user, it establishes a secure, independent, encrypted communication channel between the user interface window and the security server on top of the original communication channel. It then generates and transmits to the user interface window and/or receives from the user interface window via the secure communication channel, key material and certificate material for public key and/or symmetric key cryptography based operations.

20 Claims, 2 Drawing Sheets

(51) Int. Cl.
*H04L 29/06* (2006.01)
*H04W 12/04* (2009.01)
*H04L 9/32* (2006.01)

(52) U.S. Cl.
CPC .......... *H04L 63/062* (2013.01); *H04L 63/0838* (2013.01); *H04L 63/126* (2013.01); *H04L 63/18* (2013.01); *H04L 9/3215* (2013.01); *H04L 63/0823* (2013.01); *H04L 63/0853* (2013.01); *H04L 63/1483* (2013.01); *H04L 2463/082* (2013.01); *H04W 12/04* (2013.01)

(56) References Cited

U.S. PATENT DOCUMENTS

| | | |
|---|---|---|
| 8,136,148 B1 | 3/2012 | Chayanam et al. |
| 2002/0091928 A1 | 7/2002 | Bouchard et al. |
| 2002/0095507 A1 | 7/2002 | Jerdonek |
| 2003/0028451 A1 | 2/2003 | Ananian |
| 2003/0070070 A1 | 4/2003 | Yeager et al. |
| 2004/0030934 A1 | 2/2004 | Mizoguchi et al. |
| 2004/0210536 A1 | 10/2004 | Gudelj et al. |
| 2004/0225878 A1 | 11/2004 | Costa-Requena et al. |
| 2004/0242238 A1 | 12/2004 | Wang et al. |
| 2005/0071282 A1 | 3/2005 | Lu et al. |
| 2005/0135242 A1 | 6/2005 | Larsen et al. |
| 2005/0172229 A1 | 8/2005 | Reno et al. |
| 2005/0254653 A1 | 11/2005 | Potashnik et al. |
| 2006/0168259 A1 | 7/2006 | Spilotro |
| 2006/0168663 A1 | 7/2006 | Viljoen et al. |
| 2006/0235795 A1 | 10/2006 | Johnson et al. |
| 2007/0011724 A1 | 1/2007 | Gonzalez et al. |
| 2007/0067828 A1 | 3/2007 | Bychkov |
| 2007/0074276 A1 | 3/2007 | Harrison et al. |
| 2007/0079135 A1 | 4/2007 | Saito |
| 2007/0157304 A1 | 7/2007 | Logan et al. |
| 2007/0174904 A1 | 7/2007 | Park |
| 2007/0186095 A1 | 8/2007 | Ganesan et al. |
| 2007/0198437 A1 | 8/2007 | Eisner et al. |
| 2007/0234061 A1 | 10/2007 | Teo |
| 2007/0279227 A1 | 12/2007 | Juels |
| 2007/0283273 A1 | 12/2007 | Woods |
| 2008/0028447 A1 | 1/2008 | O'Malley et al. |
| 2008/0034216 A1 | 2/2008 | Law |
| 2008/0052180 A1 | 2/2008 | Lawhorn |
| 2008/0109657 A1 | 5/2008 | Bejaj et al. |
| 2008/0120707 A1 | 5/2008 | Ramia |
| 2008/0172730 A1 | 7/2008 | Sandhu et al. |
| 2008/0254765 A1 | 10/2008 | Eliaz |
| 2009/0037983 A1 | 2/2009 | Chiruvolu et al. |
| 2009/0093300 A1 | 4/2009 | Lutnick et al. |
| 2009/0119754 A1 | 5/2009 | Schubert |
| 2009/0119776 A1 | 5/2009 | Palnitkar et al. |
| 2009/0132813 A1 | 5/2009 | Schibuk |
| 2009/0235339 A1 | 9/2009 | Mennes et al. |
| 2009/0249076 A1 | 10/2009 | Reed et al. |
| 2009/0249077 A1 | 10/2009 | Gargaro et al. |
| 2009/0254572 A1 | 10/2009 | Redlich et al. |
| 2009/0259588 A1 | 10/2009 | Lindsay |
| 2009/0259848 A1 | 10/2009 | Williams et al. |
| 2009/0265768 A1 | 10/2009 | Labaton |
| 2009/0288159 A1 | 11/2009 | Husemann et al. |
| 2009/0328168 A1 | 12/2009 | Lee |
| 2010/0017860 A1 | 1/2010 | Ishida |
| 2010/0024022 A1 | 1/2010 | Wells et al. |
| 2010/0041391 A1 | 2/2010 | Spivey et al. |
| 2010/0111300 A1 | 5/2010 | Kido et al. |
| 2010/0235897 A1 | 9/2010 | Mason et al. |
| 2010/0262834 A1 | 10/2010 | Freeman et al. |
| 2010/0268831 A1 | 10/2010 | Scott et al. |
| 2011/0153496 A1 | 6/2011 | Royyuru |
| 2011/0161989 A1 | 6/2011 | Russo et al. |
| 2011/0208801 A1 | 8/2011 | Thorkelsson et al. |
| 2012/0005483 A1 | 1/2012 | Patvarczki et al. |
| 2012/0124651 A1 | 5/2012 | Ganesan et al. |

FOREIGN PATENT DOCUMENTS

| | | |
|---|---|---|
| JP | 11-338933 | 12/1999 |
| JP | 2002-259344 | 9/2002 |
| JP | 2005-209083 | 8/2005 |
| JP | 2010-224810 | 10/2010 |
| WO | 2008/098004 A2 | 8/2008 |
| WO | WO 2009/001855 | 12/2008 |
| WO | WO 2011/142929 | 11/2011 |
| WO | WO 2012/060891 | 5/2012 |
| WO | WO 2013/101286 | 7/2013 |

OTHER PUBLICATIONS

Saxena, N. et al., Secure Device Pairing based on a Visual Channel, pp. 1-17.
Kim, E., et al., Providing Secure Mobile Device Pairing Based on Visual Confirmation, The 13th IEEE International Symposium on Consumer Electronics (ISCE2009), pp. 676-680.
International Search Report/Written Opinion, PCT/US2011/022486, mailed Apr. 20, 2011.
International Search Report/Written Opinion, PCT/US2011/023528, mailed Apr. 27, 2011.
International Search Report/Written Opinion, PCT/US2011/032295, mailed Jun. 13, 2011.
International Search Report/Written Opinion, PCT/US2011/032271, mailed Jul. 11, 2011.
International Search Report and Written Opinion, PCT/US2012/032840, Jun. 20, 2012.
Gralla, P. How the Internet Works, 2006, Que, pp. 346-347.
WOT *online). Against Intuition Inc., 2006 [retrieved on Aug. 24, 2012). Retrieved from the *Internet: URL:web.archive.org/web/20061127233933/http://www.mywot.com/en/wot/help/wot_symbols_explained/, pp. 1-3.
Admin, Battle.net mobile authenticator for free!, Jun. 2010, Retrieved from the Internet <URL: warcraftguru.com/tag/battle-net-mobile-authenticator-for-free>, pp. 1-3 as printed.
PCT International Search Report and Written Opinion issued in International Application No. PCT/US 11/22482 on Jan. 26, 2011.
PCT International Search Report and Written Opinion issued in the International Application No. PCT/US2011/023525 on Apr. 5, 2011.
Extended European Search Report issued in European Application No. 12 862 057.2 dated Dec. 9, 2014.

KEY MANAGEMENT USING QUASI OUT OF BAND AUTHENTICATION ARCHITECTURE

RELATED APPLICATIONS

This application is related to pending application Ser. No. 13/081,150, filed Apr. 6, 2011 and entitled "FLEXIBLE QUASI OUT OF BAND AUTHENTICATION ARCHITECTURE", which claims priority based on Provisional U.S. Application Ser. No. 61/334,776, filed May 14, 2010. This application is also related to pending application Ser. No. 13/081,067, filed Apr. 6, 2011 and entitled "SECURE AND EFFICIENT LOGIN AND TRANSACTION AUTHENTICATION USING IPHONES™ AND OTHER SMART MOBILE COMMUNICATION DEVICES", which claims priority based on Provisional U.S. Application Ser. No. 61/327,723, filed Apr. 26, 2010. This application is also related to pending application Ser. No. 12/938,161, filed Nov. 2, 2010 and entitled "A NEW METHOD FOR SECURE SITE AND USER AUTHENTICATION", which claims priority based on Provisional U.S. Application Ser. No. 61/257,207, filed Nov. 2, 2009 and entitled "Project Seal". This application is also related to pending application Ser. No. 13/006,806, filed Jan. 14, 2011 and entitled "A NEW METHOD FOR SECURE USER AND SITE AUTHENTICATION", which is a continuation of pending application Ser. No. 12/938,161. This application is also related to pending application Ser. No. 13/011,587, filed Jan. 21, 2011, and entitled A NEW METHOD FOR SECURE USER AND TRANSACTION AUTHENTICATION AND RISK MANAGEMENT", which claims priority based on Provisional U.S. Application Ser. No. 61/298,551, filed Jan. 27, 2010 and entitled "Authentication-The Game Changer". This application is also related to application Ser. No. 13/011,739, filed Jan. 21, 2011, and entitled A NEW METHOD FOR SECURE USER AND TRANSACTION AUTHENTICATION AND RISK MANAGEMENT", which is a continuation-in-part of pending application Ser. No. 13/011,587. The contents of the above identified applications are hereby incorporated herein in their entirety by reference.

TECHNICAL FIELD

This invention relates to security and privacy. More particularly it relates to using the quasi out of band authentication (QOOBA) architecture for key management.

BACKGROUND OF THE INVENTION

The increasing sophistication of site specific attacks based on man-in-the-middle (MITM) and man-in-the-browser (MITB) techniques has profound implications for our current authentication techniques. Specifically, the strength of the initial login authentication is increasingly becoming less relevant as these attacks manipulate transactions after the legitimate user has provided the initial credentials to login. In reaction to this trend, leading organizations have begun deploying transaction authentication systems, such as EMV-CAP based token authenticators, or have been using out of band authentication (OOBA) techniques to ensure that the user actually intended the transaction being seen at the back end. However, such approaches are inherently not easy to use and consequently, even when deployed, are generally used only for high risk transactions or occasional events like profile changes. For the vast majority of transactions no current authentication solution provides a reasonable point in the "How easy? How secure? How costly?" trade-off.

In prior work (see the related applications identified above), we described innovations that address some of the problems with conventional authentication systems. Specifically, we introduced the notion of using QOOBA techniques to ensure that the user actually intended the transaction being seen at the back end. We also described how these techniques can be used to provide a user with a one time password (OTP) to enable login into a website (i.e. authentication of the user to the website), based on a secret shared between the web site and a QOOBA security server. Thus these techniques can be used to provide the security of one time passwords, but do not require a per user shared secret which all prior one time password systems have required.

We also extended our prior work to address the issue of providing an authentication solution for the vast majority of transactions at a reasonable point in the "How easy? How secure? How costly?" trade-off.

Here, we extend our prior work to consider solutions to the key management problem, which surfaces in various contexts. Three of many potential examples include the following.

Below we will describe various examples of how key management can be beneficially layered on top of a QOOBA architecture. Our first example relates to digital signing. In applications that require digital signing, a user needs to be provisioned a private key and a digital certificate, i.e. a binding of the user's identity and public key as certified by a Certificate Authority. The use of such a private key, which is not known to any $3^{rd}$ party, including the security server, provides for strong non-repudiation which is necessary for some applications. We follow the industry convention of referring to signatures created with public key cryptography as "digital signatures". As will be understood by those skilled in the art, signatures based on underlying symmetric cryptography with shared secrets, like that which the QOOBA system as described above already provides, are usually referred to as "electronic signatures".

Our second example relates to encrypted document delivery. When an encrypted file is sent to a user, for example a PDF of a brokerage statement, the user needs to be provided with the key with which the file was encrypted.

Our third example relates token authenticators. When users are provisioned a token authenticator, either for a one time password generator or a transaction authenticator, the user's token needs to be provided with a shared secret key. Those skilled in the art will recognize that in this context, the shared secret key is often characterized as a "seed").

In all these examples key management adds directly to the cost of the system, and indirectly effects the security. Keys need to be generated, distributed and maintained in sync. As keys can get lost, corrupted or stolen, key management is usually a significant source of costs, and a point of vulnerability in the system.

OBJECTIVES OF THE INVENTION

Accordingly, it is an objective of the present invention to provide an innovative way to leverage the QOOBA system to perform key management for digital signing, encryption and token seed management.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with certain preferred aspects of the invention, a security server can be operated so as to provide key management layered on a quasi out of band authentication system. A request for activation of a user interface window for a particular user at a network device, such as a desktop computer, associated with that user is received from the network device via a communication channel. At this point, the communication channel is non-secure or what is sometimes referred to as "clear". It will be recognized by those skilled in the art that having an non-secure channel at this point in a communication protocol is not unusual. For example, when a user initiates communications with an SSL protected website, an insecure or clear TCP/IP connection is initially set up, and only later is SSL security established on top of the non-secure or clear TCP/IP connection.

Next, to authenticate the user to the security server, an activation PIN (personal identification number) is transmitted to an out of band authentication (OOBA) system for forwarding to the user's telephone via a voice or text message. For example, the OOBA system may place a call to the user's home or cell phone, and convey the PIN to the user verbally, or may send a text message to the user's smart phone, e.g. the user's IPhone™ or Blackberry™, and convey the PIN to the user in written form. In either case, the user must enter, i.e. copy, the conveyed PIN into the user interface window, so that it will be conveyed back to the security server. In this way, the PIN previously transmitted by the security server to the OOBA system is received back by the security server from the user's network device via the communication channel, and the user is authenticated, or authentication is refused, based on the returned PIN.

Subject to the user being authenticated by the security server, a secure, independent, encrypted communication channel between the user interface window and the security server is established on top of the originally established communication channel. With this secure channel established, key material and/or certificate material for public key and/or symmetric key cryptography based operations can be generated and/or securely transmitted between the user interface window and the security server. It is perhaps worthwhile noting here that key material and certificate material are well understood terms in the art. For example, key material often includes symmetric keys or asymmetric keys and certificate material often includes user identity and public key binding.

In implementations involving the generation and transmission of key material for public key cryptography, the security server preferably receives a public key Pu of a private/public key pair Du/Pu associated with the user and previously generated by the user interface window. The public key Pu is received from the user interface window via the secure, independent, encrypted communication channel. In response, the security server transmits a signed certificate, which associates the user with the received public key Pu, and instructions for storage of the certificate, both going to the user interface window via the secure channel.

The certificate may be signed by the security server itself or by an external authenticating authority, such as a third party certificate authority. If the security server acts as an Intermediate or Root Certificate Authority, preferably the security server generates and signs the certificate using locally stored certificate authority key material. If, on the other hand, the certificate is signed by an external certificate authority, the security server preferably sends an unsigned certificate to the external certificate authority and receives the signed certificate from the certificate authority. In such a case, it is the certificate signed by the external certificate authority that is transmitted by the security server to the user interface window.

The transmitted storage instruction may, depending on the implementation, require storage of the user private key Du and signed certificate in memory on the user's network device, or in the key store of an operating system, such as the Windows™ operating system, of the network device, or both. Alternatively, the transmitted storage instruction may explicitly or implicitly leave the storage decision to the user interface window. For example, if no storage instruction is provided this may be considered by the user interface window to be an implicit instruction that it is up to the user interface window to decide where to store the user private key Du and signed certificate. Storage may be for the benefit of only the user interface window, or it may additionally be for the benefit of other local applications, which may include the browser application.

In implementations involving the generation and transmittal by the security server of key material for symmetric key cryptography operations, the security server beneficially receives an authenticated request containing unique identifying information associated with the user or with a file, i.e. a document, such as an Adobe™ or WinZip™ file or document. This information may be received from the user interface window or from a third party network site, such as a merchant or bank website. Irrespective of which entity the request is received from, the security server generates a unique symmetric key K. The key K is generated using a one-way function, and the key's value is derived from the received unique identifying information and a secret known only to the security server. The security server transmits the symmetric key K to the requester, i.e. the user interface window or the third party network site.

In implementations involving the security server performing public key cryptography operations to obtain a digital signature on a transaction, the security server advantageously receives the transaction and a request for digital signing of the transaction from a third party network site, such as a merchant or bank website. The security server transmits the transaction and a request for a digital signature to the user interface window via the secure channel. In response, the security server receives, from the user interface window, a hash of the transmitted transaction digitally signed with the user's private key Du via the secure channel. The security server next transmits the received digitally signed hash of the transaction and a certificate to the third party network site. The security server also transmits instructions for the third party network site to verify the digital signature by recomputing the hash and comparing it with the hash that can be recovered from the transmitted digitally signed hash by applying the user's public key Pu included in the transmitted certificate to the transmitted digitally signed hash. This instruction can be explicit or implicit. For example, the security server may provide no instruction regarding verification and this may be considered by the third party network site as an implicit instruction to perform verification in the manner described about.

Even if a digital signature is required, it may be desirable to also obtain the user's electronic signature on the transaction. If so, the security server can transmit, to the user interface window for presentation to the user, a personal identification number (PIN) with which to electronically sign the transaction presented in a browser window displayed at the user's network device. The PIN is transmitted via the secure, independent, encrypted communication channel. The user enters the transmitted PIN presented in the user interface window into a browser window, which is communicating with the third party network site with which the user is transacting the business, to electronically sign the transaction. It is highly preferable that the PIN corresponds to a secret shared by the security server and the third party network site, but not by the user.

The transmitted transaction may or may not include an instruction to present the transaction to the user in the user interface window and/or to obtain approval of the user prior to digitally signing of the transaction. Here again, the instruction may be explicit or implicit. For example, in the case of approval, the user's approval of the transaction might require the user to click on an approved button presented in the user interface window, prior to the user interface window digitally signing the transaction. Alternatively, approval might be signaled by the user not rejecting the transaction presented on the user interface window within a predefined period of time after the transaction is first presented in the user interface window.

In the case of digital signatures, the user interface window may manage storage of the user's private key Du and the signed certificate in memory, or in the key store of an operating system of the network device, or in both, for the benefit of other local applications. The security server may also verify the digital signature before transmitting the received digitally signed hash of the transaction and the certificate to the third party network site. To verify the signature, the security server recomputes the hash of the transaction and compares it with the hash recovered from the received digitally signed hash by applying the user's public key Pu included in the received certificate to the received digitally signed hash of the transaction.

In implementations involving the security server performing symmetric key cryptography based operations that include sharing encryption keys, the security server receives a request for one or more encryption keys associated with particular combinations of sender identification, recipient identification and document identification, which are collectively referred to as DocumentID, from a third party network site, e.g. a merchant, a bank, the U.S. Government, etc.

The security server then generates one or more symmetric encryption keys for each DocumentID. The symmetric encryption keys are generated based on a one way function, the applicable DocumentID, a secret known only to the security server and, if desired, other information commonly used to generate symmetric crypto keys and well known to those skilled in the art. The security server transmits the generated encryption keys to the third party network site, with instructions to encrypt the document represented by the applicable DocumentID with the appropriate key(s) and to transmit the encrypted document to the user. Here again, the instructions may be explicit or implicit.

The security server next receives a request for the one or more symmetric encryption keys required to decrypt a document represented by a particular applicable DocumentID. The request includes the applicable DocumentID and is received from software, other than the user interface window, which is operating on the network device and being used to open an encrypted document represented by an applicable DocumentID. For example, the request may be received from Adobe™ or WinZip™ or browser software. It may in certain cases be preferable to receive the request directly from the software. However, in other cases it may be preferable to receive the request from the software via a network site which is in communication with the software attempting to open the document.

The security server recomputes or receives the applicable one or more symmetric encryption keys. It then transmits the recomputed or received applicable encryption key(s) to the user interface window. Transmitted with the applicable key(s) are instructions to present the applicable key(s) to the user for copying, i.e. entry, into the software to decrypt the document represented by the applicable DocumentID. Here again, the instructions to the user interface window can be explicit or implicit.

If received, the applicable symmetric encryption key(s) are received from a network site in communication with the software attempting to open the document, and the key(s) transmitted to the user interface window are the key(s) received by the security server from the network site. If recomputed, the security server recomputes the applicable key(s) based on the one way function, the applicable DocumentID, the secret known only to the security server and the other information, and the key(s) transmitted to the user interface window are the recomputed key(s).

In implementations involving the security server performing symmetric key cryptography based operations to provide a seed for token authenticator hardware or software, the security server receives a request for a token seed from the user interface window. Along with the token seed request it also receives a user identifier and/or a token identifier for which the seed is requested.

The security server generates the seed, based on a one way function, the identifier or identifiers, a secret known only to the security server and other information well known to those skilled in the art. It then transmits, to the user interface window, the generated seed with explicit or implicit instructions to either present the transmitted seed to the user on the user interface window display for entry by the user into a seeding interface of the token or to enter the transmitted seed into the seeding interface of the token directly without user intervention. This transmission is made to the user interface window via the secure, independent, encrypted communication channel. The transmitted seed may, in certain implementations, beneficially be an intermediate seed, which will be processed by the token software to generate the final seed.

BRIEF DESCRIPTION OF DRAWINGS

FIG. 2 shows the flexible quasi out of band authentication architecture with the key management functionality layered on top, in accordance with the present invention.

PREFERRED EMBODIMENT(S) OF THE INVENTION

General Overview of Prior Work Related to QOOBA

In prior work we have described how the introduction of a network based security server, which has an independent channel to a window displayed on a user device, can be used in conjunction with a user's browser, computer software or smart phone or other mobile communications device application, and the website they are visiting to provide user authentication for login or transaction authorization via one or more user network device.

QOOBA is an innovative approach to create a solution that can be used to authenticate every transaction in a manner that will feel natural to users. The central idea is to create a small secure window, the QOOBA Window, that has an independent encrypted channel to a secure server (the QOOBA Server). The QOOBA Window can be implemented as a zero-download browser pop-up (the QOOBA Pop-up Window), as a small desktop application (the QOOBA Software Window) or as an app on a smart phone (the QOOBA Phone Window). An important aspect to the innovation is that, unlike as with soft tokens, the QOOBA Window does not require secure storage of long term secrets. Rather, it is "activated" during login by using out of band authentication. As a user transacts at a web site, (e.g. a merchant or bank website, that is part of the QOOBA Network, the transactions that the web site believes the user intends are sent securely via the user's browser to the QOOBA Server which displays the transaction in the QOOBA Window. The user is also optionally shown a transaction signature that the user can cut and paste from the QOOBA Window into their browser to authenticate to the website for login or transaction authorization purposes.

Overview Of Prior Work Relating to a Flexible QOOBA Architecture

The QOOBA solution has the following benefits in terms of ease of use, total cost of ownership and, of particular interest here, security.

First, with regard to ease of use, the user has no new device to carry or password to remember, beyond having access to the phone used for out of band authentication. The user does not have to enter any cryptic transaction code into a device and type the result into the browser. Instead, the user sees the entire transaction in their QOOBA Window and can copy and paste the transaction signature with a few clicks.

Second, with regard to total cost of ownership, the QOOBA architecture significantly reduces total lifecycle costs. It requires no new hardware and, unlike a soft token, does not require per user provisioning and management of secrets. Further, as all communications between the web site and the QOOBA server can occur via the browser, the integration requirements at the web site are extremely light. The overall costs of the QOOBA solution are designed to be significantly less than an equivalent soft token deployment, and far less than that of a physical token.

Finally, in terms of security, as will be further discussed below, the level of assurance depends on the form factor of the QOOBA Window that is used. The smartphone based QOOBA Window, i.e. the QOOBA Phone Window, provides the highest assurance, but even the zero download pop-up, i.e. the QOOBA Pop-up Window, significantly raises the bar for an attacker. The software QOOBA window, i.e. the QOOBA Software Window, is likely to be satisfactory for almost all risk levels.

In our prior work we have described how, by implementing the QOOBA solution using a flexible QOOBA architecture, the web sites in the QOOBA Network are allowed to request or select the form factor and a type of transaction approval appropriate for the transaction. For instance, a user can simultaneously have a QOOBA Window on their smartphone as well as on their desktop. While most transactions can be sent to their desktop QOOBA Software Window (which is far more convenient), the highest risk transactions can be sent to their smartphone QOOBA Phone Window. A user can be requested to approve most transactions by simply clicking on an approval button, but allowed to approve other transactions by simply taking no action and still other transactions by placing a secure electronic signature on the transaction.

Overlaying Key Management on the QOOBA Architecture

We now describe how we overlay components for key management on the QOOBA architecture.

The QOOBA System

Figure 1:
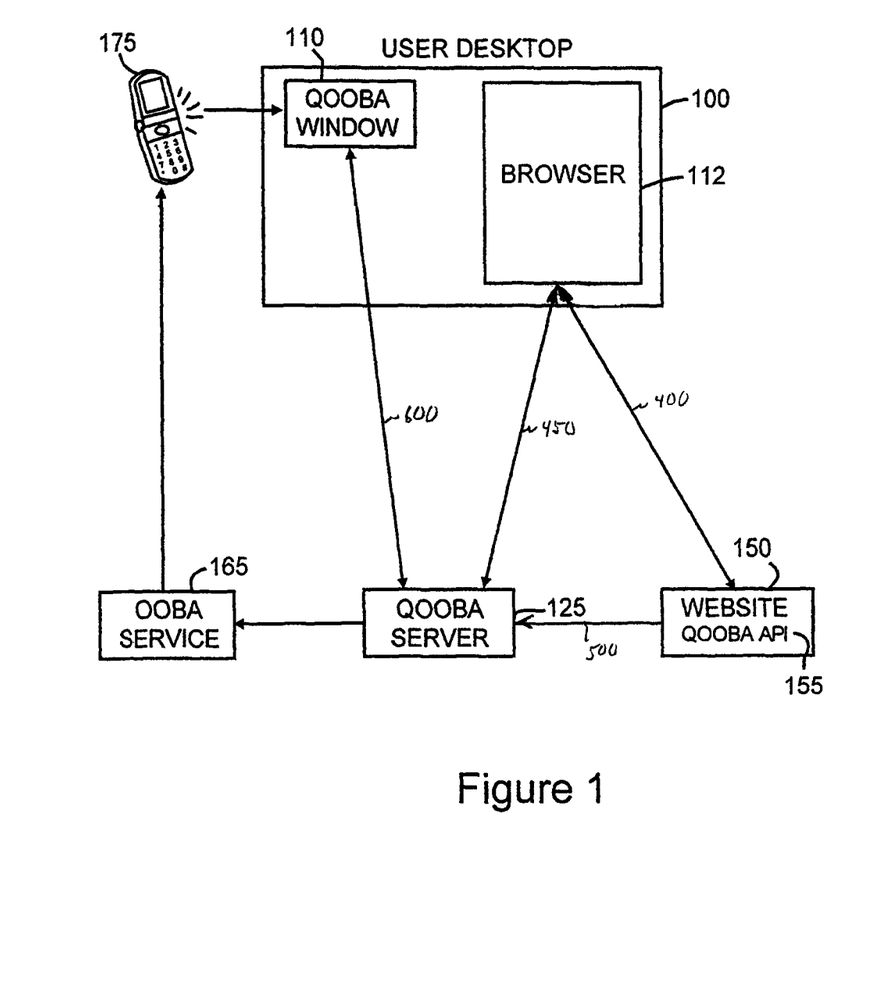
FIG. 1 depicts the main components of the flexible quasi out of band authentication architecture, in accordance with the present invention.

Referring now to FIG. 1, in accordance with the present invention, the QOOBA system consists of a desktop personal computing device 100 having the QOOBA Window 110 and a Browser Window 112 executing and displayed thereon, a QOOBA Server 125 and Web Service 150, which has the QOOBA Application Programming Interface (API) 155 operable thereon. It should be understood that in a practical implementation there would typically be multiple websites. Also included in the system as shown is an OOBA Service 165, which is utilized by the QOOBA Server 125 to bootstrap authentication of the user using the user's phone 175, which may be a landline, cellphone or smartphone.

As described in more detail in the related applications referenced above, the user activates the QOOBA Window 110, typically by using out of band authentication via OOBA Service 165, and establishes a session with the QOOBA Server 125. Web Service 150 participates in the QOOBA Network and goes through a onetime set up process to establish a shared secret with the QOOBA Server 125, which is not shared with or known by the user. When the user has an active session with the QOOBA Server 125 via communication channel 450 and is also at the Website 150 via communication channel 400, the Website can use the QOOBA API 155 to request, via back end communication channel 500, transaction authentication by sending the transaction directly to the QOOBA Server 125. The QOOBA Server 125 then displays the transaction to the user in the applicable QOOBA Window, which is shown in FIG. 1 to be Window 110.

The QOOBA Windows

The QOOBA Server 125 can present various information to the user in the displayed QOOBA Window 110. For example, as we have described in our prior work, the QOOBA Server 125 can display a transaction to the user in the QOOBA Window 110, and if requested, also display in the QOOBA Window 110 a transaction, i.e. electronic, signature derived from the transaction, the secret shared between the QOOBA Server 125 and the Website 150, and other information. This is accomplished via communication channel 600. The user is optionally given the choice of accepting or rejecting the transaction. Acceptance can be signaled passively by taking no action, by clicking OK within the QOOBA Window 110 and sending a signal via communication channel 600 back to the QOOBA Server 125, or by copying and pasting the transaction signature from the QOOBA Window 110 into the web application displayed in the Browser Window 112 and then sent back to the Web Service 150 via communication channel 400. If the transaction signature from the QOOBA Window 110 is pasted into the web application displayed in the Browser Window 112, the Website 150 can verify the signature using the transaction, the secret shared between the QOOBA Server 125 and the Web Service 150, and other information.

Thus, one approval type may be characterized as "INFORM". The transaction is simply shown to the user, and no confirmation is required. This is like an "activity stream" and can reassure the cautious user. Another approval type can be characterized as "CONFIRM". The user is asked to confirm or deny the transaction within the QOOBA Window 110 and this response is sent back to the Web Service 150 via the QOOBA Server 125. A still further approval type can be characterized as "SIGN". The QOOBA Server 125 generates a personal identification number (PIN), which will serve as the "transaction signature", and shows it to the user within the QOOBA Window 110 or a QOOBA Window (not shown) on the smartphone. The user copies this transaction signature into their browser window 112 and sends it to the Web Service 150. As the PIN is derived from a secret shared between the QOOBA Server 125 and the Web Service 150 (and never revealed to the user), the Web Service 150 can recalculate the transaction signature independently and thus confirm the transaction. It will be observed that this achieves the same security effect of a transaction authenticator system, but there is no per user provisioning of secrets.

The user interface to the QOOBA Server 125 remains largely constant regardless of the browser and/or operating system (OS) being used and the form factor of the QOOBA Window 110. The only use-case in which the user experience deviates is when the user is browsing on a smartphone, where the QOOBA experience is optimized for the device.

As noted above, the QOOBA Window 110 can be implemented in one of at least three form factors, a browser pop-up, which we commonly refer to as the QOOBA Pop-up Window, does not require any software download, a small application that is installed on the desktop, which we commonly refer to as the QOOBA Software Window, or as a smart phone app, which we commonly refer to as the QOOBA Phone Window.

The same user might well be using different form factors at different times. For instance, a user who has the software QOOBA Window installed, and uses that most of the time, might use the browser pop-up QOOBA Window while at some other desktop (roaming). For certain high risk transactions, the website might require showing the transaction on the smartphone QOOBA Window, while most transactions are shown in the desktop window. The look and feel of the QOOBA Window 110 is entirely customizable by the particular QOOBA Network. An implementation for a bank intended solely for its own websites might look and feel very different from an implementation by a payment service that offers authentication into various eCommerce web services, like the Web Service 150. Although numerous elements are described, it should be understood that most of them are optional.

Key Management using the QOOBA Architecture

Turning to FIG. 2, central to the QOOBA system is the establishment of a secure, encrypted and independent channel 600 between the QOOBA Window on a user's desktop 100 or the QOOBA Window on the user's smartphone 175 (not shown) and the QOOBA Security Server 125. As described above, the QOOBA Window is used to show the user transactions and provide them with the opportunity to confirm, i.e. approve, the transaction.

We now introduce into the architecture, as shown in FIG. 1, the QOOBA Key Management Logic—Client (KMLC) 610 on the user's desktop 300, the QOOBA Key Management Logic—Server (KMLS) 620 on the QOOBA security server 325, the QOOBA Key Management Logic—API (KMLAPI) 630 on the Web Service 350, and the possibility of "non-browser" desktop or smartphone software (e.g. Acrobat Reader) 314. KMLC 610 and KMLS 620 communicate over the secure QOOBA channel 600 between the QOOBA Window 310 and the QOOBA security server 325. KMLS 620 and KMLAPI 630 communicate over the back-end communication channel 500 between the QOOBA security server 325 and the Web Service 350.

With further reference to FIG. 2, within the above described framework, key generation proceeds as follows. At some point after the QOOBA Window 310 is activated, the KMLC 610 generates a private/public key pair, e.g. Du/Pu and stores the private key Du securely (typically in memory). KMLC 610 sends the public-key Pu to the QOOBA Server 325, where the request is intercepted by the KMLS 620. A digital certificate ("Cert"), which includes the user's public key Pu, is prepared by KMLS 620, and one of two things happens.

If KMLS 620 is capable of acting as an Intermediate or root Certificate Authority, it signs the certificate and returns the signed certificate to KMLC 610, which maintains it locally (preferably in memory). For example, KMLS 620 could sign the Cert with the private key Ds of it's private/public key pair Ds/Ps, such that [Cert]Ds is returned to KMLC 610.

On the other hand, if KMLS 620 acts as a "registration authority", it forwards the certificate request to an external Certificate Authority 900, which creates the certificate and returns it to KMLS 620, which in turn forwards the certificate back to 610, which maintains it locally (preferably in memory). In such a case, the Cert will be signed by the Certificate Authority with the private key Dca of it's private/public key pair Dca/Pca such that [Cert]Dca is returned to KMLS 620. KMLS 620 then forwards the received signed Cert, i.e. [Cert]Dca, to the KMLC 610.

It is preferable in either instance for the Cert issued to be relatively short lived, i.e.

temporary, and coincident with the life of the QOOBA session itself. By making it simple to do key generation coincident with activation, the need to store digital certificates and private keys locally over an extended period is avoided.

In some situations, as will be discussed in more detail below, the private key and certificate may be needed by other applications, e.g. browsers 312 or document processors 314, on the same desktop (or mobile device). If the underlying operating system supports standard key stores, as MS Windows™ or Apple MacOS™ do, then the KMLC 610 can be tasked with committing the keys to the key store and deleting them when appropriate.

In addition to the above described generation of keys suitable for public key cryptography, i.e. asymmetric keys, the key management system can also generate and distribute symmetric keys. Central to this is a function Shared_Secret_Generator( ), incorporated within KMLS 620, that takes as input such factors as the UserID (perhaps the user's hard line or cell phone number), a long lived secret known only to the QOOBA Server 325, and other miscellaneous parameters, and produces as output the shared_secret K. It is important to note that for a given set of inputs the same shared secret will be computed deterministically. Different authenticated entities can request the KMLS 620 to provide them with the appropriate symmetric key by providing the KMLS 620 the applicable input parameters.

Note that depending on the application QOOBA Key Management Logic may make use of one or both of the asymmetric (i.e. public) key cryptography or symmetric key cryptography capabilities described above. We have now described the key management system including its key generation capabilities, and turn our attention to three example applications that make use of these capabilities.

Using QOOBA Key Management for Digital Signing

As described earlier, for certain applications, digital signing using public key cryptography is considered more appropriate than electronic transaction signing. Digital signing is accomplished using the steps described below.

The end user browses in browser window 312 and executes a transaction at a Web Service 350. The Web Service 350 uses the KMLAPI 630 to make a request for transaction signing with "digital signing" required. This request is sent over secure back-end communication channel 500 to KMLS 620. The request is then send from KMLS 620 to KMLC 610 via secure channel 600, with an indication that a digital signature is required. The QOOBA transaction signature PIN is optionally generated by the QOOBA Server 325 and sent along with the digital signature request. It should be understood that, as described above, the PIN could, if desired, be sent by the QOOBA Server 325 to a QOOBA Window, similar to QOOBA Window 310, displayed on the user's smartphone (not shown), via a persistent connection similar to connection 600, rather than to QOOBA Window 310 displayed on the desktop 300 as shown.

The QOOBA Window 310 shows the user the transaction as usual, and optionally requires the user to copy the transaction signature PIN, i.e. the electronic signature, into the browser window 312. In parallel the KMLC 610 computes a hash on the transaction ("HashTran") and computes a digital signature using the user's private key Du, which was previously stored in memory, the result being [HashTran]Du. This process could happen behind the scenes or by asking the user to agree to sign the transaction. In either case, the digital signature Du is applied to the hashed transaction [HashTran]. The digitally signed hash of the transaction [HashTran]Du is then sent, via secure channel 600, from KMLC 610 to KMLS 620, along with the digital certificate [Cert]Ds or [Cert]Dca.

KMLS 620 can optionally perform a validation of the signature by applying the user's public key Pu to the digital signature [HashTran]Du to obtain HashTran, and comparing it to an independently generated HashTran. Whether or not validation is performed, the KMLS 620 forwards the signature to KMLAPI 630 via secure channel 500.

KMLAPI 630 can recompute the hash HashTran and verify the signature using the user's public key Pu included in the digital certificate, Cert. Thus, the KMLAPI 630 applies the KMLS 620 public key Ps to [Cert]Ds, or the Certificate Authority public key Pca to [Cert]Dca, to recover Pu. It then applies the recovered Pu to [HashTran]Du to recover HashTran and compares it to an independently generated HashTran to verify the signature.

Note that in the above description, the hash is created at KMLC 610. However, it could as easily be created at KMLAPI 630 or KMLS 620, though it is likely that each entity would recompute it to be assured of its authenticity.

In this example the entire transaction comes to the QOOBA Window 310. If, on the other hand, a document needs to be signed using this approach, then it is possible to extend the functionality to have the KMLC commit the private key and public key to the key stores available on the user's desktop 300, which would make the keys available to other applications, e.g. browsers 312 or non-browser apps 314. KMLC would be responsible for deleting the user keys from the key store at the appropriate time.

Using QOOBA Key Management for Sharing Encryption Keys

It frequently happens that data is encrypted and forwarded to the recipient in a store and forward system such as email. For instance, regulations require that documents, such as financial statements or health records, must be sent encrypted if sent as email attachments. Many applications, e.g. WinZip™ and Acrobat Reader™, have built in password based encryption capabilities. The question then arises as to how the decryption password is sent to the user. One approach is to a priori agree on a shared password. Drawbacks of this approach are that a compromised password can be used to decrypt many documents, and it is also difficult to require complex passwords as the user is likely to forget the password. Described below are three approaches of using the QOOBA Key Management system to solve this problem.

Approach 1

A document identified uniquely, for instance by a unique DocumentID, is encrypted with a key derived from a PIN, e.g. an eight character alpha-numeric PIN, by a Web Service 350 and then sent to a user, e.g. via email. For purposes of this discussion, a DocumentID is a unique value associated with particular combinations of sender identification, recipient identification and document identification. When the user opens the document using some application 314, typically a software application, on their desktop, e.g. WinZip™ and Acrobat Reader™, the program sends a signal to the Web Service 350 indicating that the user is attempting to read the particular document. Although the application 314 could be the browser, for purposes of this discussion, as shown in FIG. 2 it is assumed to be other desktop software.

The Web Service 350 retrieves the PIN with which that document referenced by DocumentID was initially encrypted, and then uses KMLAPI 630 to send the PIN to the QOOBA server 325. The QOOBA server 325, using KMLS 620, forwards the PIN to KMLC 610 and the PIN is then displayed to the user within the QOOBA Window 310.

The user copies the PIN into the application 314 and decryption proceeds as normal. It should be observed that, in general, no changes to the application 314 are required. The ability to trigger a message to the Web Service 350 when opened is functionality that is already built into many applications (e.g. Adobe Reader).

Approach 2

One drawback of the above approach is that the Web Service 350 has to maintain a list of DocumentIDs and PINs. One way to solve this problem is to have the key with which each document is encrypted be the result of a function, which takes as input the DocumentID and a long term secret known only to the Web Service 350. This way the key can be generated dynamically after the user attempts to open the document as described in Approach 1.

Approach 3

A drawback of the above is that there is an assumption that the Web Service 350 is available and on-line when the document is opened. As some of the systems that generate and distribute documents are back-end batch systems, this assumption may not always be applicable. The QOOBA Key Management shared secret generation capability can be used to solve the problem as follows.

The Web Service 350 sends the QOOBA Server 325, either one at a time, or more likely in a batch file, the DocumentIDs it wants to encrypt. For purposes of this discussion it will be assumed that the file contains envelope information such as sender and recipient IDs. KMLS 620 uses the Shared_Secret_Generator( ) described above to compute encryption keys for each DocumentID. For example, key K1 for one DocumentID, K2 for another DocumentID, K3 for another DocumentID, etc. These keys are then returned by the KMLS 620 to Web Service 350. The Web Service 350 then encrypts each respective documents with the applicable key and sends the encrypted document, e.g. via email, to the respective applicable users.

The applicable user uses the other desktop software 314 to open the document, which triggers a request for a key directly to the QOOBA Server 325 over a secure web connection 750, which is another communication channel. It should be noted that this is a direct connection 750 from the non-browser software 314 to the QOOBA Server 325 and not through QOOBA Window 310.

This action results in the KMLS 620 using the Shared_Secret_Generator( ) to recompute the applicable encryption key, e.g. K1, K2, K3 etc. The applicable key is then sent to KMLC 610 and shown to the user in QOOBA Window 310 for copying into the Non-Browser Window 314 as described earlier.

While we have described the above using a non-browser software (e.g. Acrobat Reader) as our example, the same functionality can be used for browser based web applications.

Using QOOBA Key Management for "Seeding" One-Time-Passwords (OTPs) and Transaction Authentication Tokens One-time-passwords (OTPs) and Transaction Authentication token authenticators, e.g. hardware, software, smartphone apps, etc., all require a key which is stored in the token and is also stored at the back-end system. Managing these keys (which are commonly referred to as "seeds") introduces costs and complexity. The QOOBA Key Management System can be used to greatly simplify this process.

For purposes of this discussion it is assumed that a token authenticator (not shown) is implemented as hardware, software or as a mobile phone app. The token starts in an inactive state with no seed present (or a seed refresh is required). A request is made either directly within the QOOBA Window 310 by the user or directly from the token to the QOOBA Server 325 or to an external Web Service 350 requesting a seeding event. Some unique identifier identifying the UserID is provided to the QOOBA Server 325.

The KMLS 620 within the QOOBA Server 325 uses the unique UserID and other information, including the long term secret known only to KMLS 620, as inputs into the Shared_Secret_Generator( ) to generate a unique seed for that user. This seed is sent back to KMLC 610 via the secure channel 600, and then shown to user in the QOOBA Window 310. The user enters the seed into the software or smartphone app token. We note that the actual seed may be generated by a function that transforms the seed the user enters. It will be recognized that for hardware this will only work if the token has a keypad, which most transaction authenticators do indeed have.

As a variant of the above, observe that the transaction authenticator can be built directly into the QOOBA Window 310 as part of the functionality. While at first blush the rationale for this may not be obvious, compatibility with existing systems such as EMV/CAP provides the rationale for this approach. This on-demand seeding of the transaction authenticators vastly simplifies the costs of provisioning.

I claim:

1. A system to provide key management layered on a quasi out-of-band authentication system, comprising:
   a communications port configured to (i) receive, via a communication channel from a network device associated with a user, a request for activation of a user interface window for that particular user at the network device, (ii) transmit, to an out-of-band authentication system, an activation personal identification number (PIN) to be forwarded to a communications device associated with the user via a voice or text message, and (iii) receive, via the communication channel from the network device, the previously transmitted activation PIN; and
   a processor configured to (i) authenticate the user based on the received activation PIN, (ii) establish, on top of the communication channel after authenticating the user, a secure, independent, encrypted communication channel between the user interface window and the security server; and (iii) at least one of (a) generate and direct transmission, to the user interface window, via the communications port and the secure, independent, encrypted communication channel, key material for cryptography based operations and (b) receive from the user interface window via the secure, independent, encrypted communication channel and the communications port, key material for cryptography based operations.

2. The system according to claim 1, wherein:
   the key material is for symmetric key cryptography based operations and is generated and directed to be transmitted by the processor, and further comprising:
   the port is further configured to receive, from the user interface window or a network site, an authenticated request containing unique identifying information associated with the user or with a file;
   the processor is further configured to generate, using a one way function, a unique symmetric key K, wherein the value of the key K is derived from the received unique identifying information and a secret known only to the security server; and
   the port is further configured to transmit, to the requester, the generated symmetric key K.

3. The system according to claim 1, wherein:
   the communications port is further configured to at least one of (A) (i) receive, from a network site, a transaction and a request for digital signing of the transaction, (ii) transmit, to the user interface window via the secure, independent, encrypted communication channel, the transaction and a request for a digital signature, (iii) receive, from the user interface window via the secure, independent, encrypted communication channel, a hash of the transmitted transaction digitally signed with a private key Du of a private/public key pair Du/Pu associated with the user, and (iv) transmit to the network site, the received digitally signed hash of the transaction and a certificate, with explicit or implicit instructions for the network site to verify the digital signature by recomputing the hash and comparing it with the hash recovered from the transmitted digitally signed hash by applying the user's public key Pu included in the transmitted certificate to the transmitted digitally signed hash, and (B) transmit, to the user interface window for presentation to the user, via the secure, independent, encrypted communication channel, a signature PIN with which to electronically sign the transaction presented in a browser window displayed at the network device; and
   if the communications port is further configured to receive the transaction and the request for digital signing of the transaction, the processor is further configured to perform public key cryptography based operations to obtain a digital signature on the transaction.

4. The system according to claim 3, wherein the signature PIN corresponds to a secret shared by the security server and the network site, but not by the user.

5. The system according to claim 3, wherein:
   if the communications port receives the transaction and the request for digital signing of the transaction, the communications port is further configured to (i) receive, from the user interface window via the secure, independent, encrypted communication channel, the public key Pu, (ii) transmit to the user interface window via the secure, independent, encrypted communication channel, (a) the certificate signed by the processor or an external authenticating authority and associating the user with the received public key Pu, and (b) instructions for storage of the certificate and the user's private key Du; and
   the instructions explicitly or implicitly instruct the user interface window to manage storage of the user's private key Du and the signed certificate (i) in memory, or (ii) in the key store of an operating system of the network device, or (iii) both for the benefit of other local applications.

6. The system according to claim 1, wherein:
the processor is further configured to perform symmetric key cryptography based operations, and the symmetric key cryptography based operations include sharing encryption keys;
the communications port is further configured to receive, from a network site, a request for one or more encryption keys associated with particular combinations of sender identification, recipient identification and document identification, collectively referred to as DocumentlD;
the processor is further configured to generate one or more symmetric encryption keys for each DocumentlD, based on a one way function, the DocumentlD, a secret known only to the processor and other information;
the communications port is further configured to (i) transmit, to the network site, the encryption keys, with explicit or implicit instructions to encrypt the document represented by the applicable DocumentlD with the appropriate encryption key or keys and to transmit the encrypted document to the user, and (ii) receive, from software, other than the user interface window, that is operating on the network device and being used to open the encrypted document represented by the applicable DocumentlD, a request, including the applicable DocumentlD, for the one or more symmetric encryption keys required to decrypt the encrypted document represented by the applicable DocumentlD;
the processor is further configured to (i) recompute, or receive via the communications port, the applicable one or more symmetric encryption keys, and (ii) direct transmission, to the user interface window via the communications port, the recomputed or received applicable one or more symmetric encryption keys, with explicit or implicit instructions to present the applicable one or more symmetric encryption keys to the user for entry into the software to decrypt the encrypted document represented by the applicable DocumentlD.

7. The system according to claim 6, wherein the request for the one or more symmetric encryption keys from the software is received via a network site which is in communication with the software attempting to open the encrypted document.

8. The system, according to claim 6, wherein:
the processor receives the applicable one or more symmetric encryption keys from a network site which is in communication with the software attempting to open the document; and
the applicable one or more symmetric encryption keys directed to be transmitted to the user interface window are the applicable one or more symmetric encryption keys received from the network site.

9. The system according to claim 1, wherein:
the processor performs symmetric key cryptography based operations, and the symmetric key cryptography based operations include providing a seed for token authenticator hardware or software;
the communications port is further configured to receive, from the user interface window, a request for a token seed, and at least one of (i) a user identifier and (ii) a token identifier for which the seed is requested;
the processor is further configured to generate the seed, based on a one way function, the at least one identifier, a secret known only to the processor and other information; and the communications port is further configured to transmit, to the user interface window via the secure, independent, encrypted communication channel, the generated seed, with explicit or implicit instructions to either (i) present the transmitted seed to the user on the user interface window display for entry by the user into a seeding interface of the token or (ii) enter the transmitted seed into the seeding interface of the token directly without user intervention.

10. A system according to claim 9, wherein the transmitted seed is an intermediate seed for processing by the token software to generate the final seed.

11. An article of manufacture for providing key management layered on a quasi out-of-band authentication system, comprising:
non transitory storage media; and
logic stored on the storage media, wherein the stored logic is configured to be executable by a computer and thereby cause the computer to operate so as to:
receive, via a communication channel from a network device associated with a user, a request for activation of a user interface window for that particular user at the network device;
transmit, to an out of band authentication system, an activation personal identification number (PIN) to be forwarded to the user's telephone via a voice or text message;
receive, via the communication channel from the network device, the previously transmitted activation PIN;
authenticate the user based on the received activation PIN;
establish, on top of the communication channel after authenticating the user, a secure, independent, encrypted communication channel between the user interface window and the security server; and
at least one of (i) generate and transmit to the user interface window via the secure, independent, encrypted communication channel key material for cryptography based operations and (ii) receiving from the user interface window via the secure, independent, encrypted communication channel, key material for cryptography based operations.

12. The article of manufacture according to claim 11, wherein:
the key material is for symmetric key cryptography based operations and is generated and transmitted by the computer; and
execution of the stored logic thereby causes the computer to operate so as to also (i) receive, from the user interface window or a network site, an authenticated request containing unique identifying information associated with the user or with a file, (ii) generate, using a one way function, a unique symmetric key K, wherein the value of the key K is derived from the received unique identifying information and a secret known only to the security server, and (iii) transmit, to the requester, the generated symmetric key K.

13. The article of manufacture according to claim 11, wherein:
execution of the stored logic thereby causes the computer to operate so as to at least one of (A) (i) perform public key cryptography based operations to obtain a digital signature on a transaction, (ii) receive, from a network site, the transaction and a request for digital signing of the transaction, (iii) transmit, to the user interface window via the secure, independent, encrypted communication channel, the transaction and a request for a digital signature, (iv) receive, from the user interface window via the secure, independent, encrypted communication channel, a hash of the transmitted transaction digitally signed with a private key Du of a private/public key pair Du/Pu associated with the user, and (v) transmit to the network site, the received digitally signed hash of the transaction and a certificate, with explicit or implicit instructions for the network site to verify the digital signature by recomputing the hash and comparing it with the hash recovered from the transmitted digitally signed hash by applying the user's public key Pu included in the transmitted certificate to the transmitted digitally signed hash, and (B) transmit, to the user interface window, for presentation to the user, via the secure, independent, encrypted communication channel, a signature PIN with which to electronically sign the transaction presented in a browser window displayed at the network device.

14. The article of manufacture according to claim 13, wherein the signature PIN corresponds to a secret shared by the security server and the network site, but not by the user.

15. The article of manufacture according to claim 13, wherein:
    if execution of the stored logic causes the computer to operate so as to perform public key cryptography based operations to obtain a digital signature on a transaction, execution of the stored logic thereby causes the computer to operate so as to also (i) receive, from the user interface window via the secure, independent, encrypted communication channel, the public key Pu, and (ii) transmit to the user interface window via the secure, independent, encrypted communication channel, the certificate signed by the computer or an external authenticating authority and associating the user with the received public key Pu, and instructions for storage of the certificate and the user's private key Du;
    the instructions explicitly or implicitly instruct the user interface window to manage storage of the user's private key Du and the signed certificate (i) in memory, or (ii) in the key store of an operating system of the network device, or (iii) both for the benefit of other local applications.

16. The article of manufacture according to claim 11, wherein:
    execution of the stored logic thereby causes the computer to operate so as to (i) perform symmetric key cryptography based operations, including sharing encryption keys, (ii) receive, from a network site, a request for one or more encryption keys associated with particular combinations of sender identification, recipient identification and document identification, collectively referred to as DocumentID, (iii) generate one or more symmetric encryption keys for each DocumentID, based on a one way function, the DocumentID, a secret known only to the computer and other information, (iv) transmit, to the network site, the encryption keys, with explicit or implicit instructions to encrypt the document represented by the applicable DocumentID with the appropriate encryption key or keys and to transmit the encrypted document to the user, (v) receive, from software, other than the user interface window, that is operating on the network device and being used to open the encrypted document represented by the applicable DocumentID, a request, including the applicable DocumentID, for the one or more symmetric encryption keys required to decrypt the encrypted document represented by the applicable DocumentID, (vi) recompute or receive the applicable one or more symmetric encryption keys; and (vii) transmit, to the user interface window, the recomputed or received applicable one or more symmetric encryption keys, with explicit or implicit instructions to present the applicable one or more symmetric encryption keys to the user for entry into the software to decrypt the encrypted document represented by the applicable DocumentID.

17. The article of manufacture according to claim 16, wherein the request for the one or more symmetric encryption keys from the software is received via a network site which is in communication with the software attempting to open the encrypted document.

18. The article of manufacture according to claim 16, wherein:
    execution of the stored logic thereby causes the computer to operate so as to also receive the applicable one or more symmetric encryption keys from a network site which is in communication with the software attempting to open the document; and
    the applicable one or more symmetric encryption keys transmitted to the user interface window are the applicable one or more symmetric encryption keys received from the network site.

19. A article of manufacture according to claim 11, wherein execution of the stored logic thereby causes the computer to operate so as to (i) perform symmetric key cryptography based operations, including providing a seed for token authenticator hardware or software, (ii) receive, from the user interface window, a request for a token seed, and at least one of (a) a user identifier and (b) a token identifier for which the seed is requested, (iii) generate the seed based on a one way function, the at least one identifier, a secret known only to the computer and other information, and (iv) transmit, to the user interface window via the secure, independent, encrypted communication channel, the generated seed, with explicit or implicit instructions to either (a) present the transmitted seed to the user on the user interface window display for entry by the user into a seeding interface of the token or (b) enter the transmitted seed into the seeding interface of the token directly without user intervention.

20. A article of manufacture according to claim 19, wherein the transmitted seed is an intermediate seed for processing by the token software to generate the final seed.

* * * * *